(12) United States Patent
Woldekidan

(10) Patent No.: US 7,055,876 B2
(45) Date of Patent: Jun. 6, 2006

(54) BAG FOR CARRYING BOX-SHAPED OBJECTS

(76) Inventor: Tezzi Woldekidan, Junkergatan 17, Hagersten (SE) S-126 53

( * ) Notice: Subject to any disclaimer, the term of this patent is extended or adjusted under 35 U.S.C. 154(b) by 65 days.

(21) Appl. No.: 10/473,858

(22) PCT Filed: Apr. 3, 2002

(86) PCT No.: PCT/SE02/00649

§ 371 (c)(1),
(2), (4) Date: Oct. 3, 2003

(87) PCT Pub. No.: WO02/080724

PCT Pub. Date: Oct. 17, 2002

(65) Prior Publication Data

US 2004/0130170 A1    Jul. 8, 2004

(30) Foreign Application Priority Data

Apr. 5, 2001  (SE) .................. 0101211

(51) Int. Cl.
*A45F 5/00* (2006.01)

(52) U.S. Cl. .............. 294/152; 294/145; 383/12; 383/33; 383/41; 383/66; 383/104; 383/123

(58) Field of Classification Search ........... 294/27.1, 294/31.2, 32, 74, 137, 141, 145, 149, 151, 294/152, 153, 154, 155, 156, 161; 190/112, 190/107; 206/453, 475, 503, 508, 509, 510, 206/512, 555, 218, 307, 600, 424; 383/12.33, 383/41, 104, 123, 124, 6, 17, 66, 907; 229/117.22
See application file for complete search history.

(56) References Cited

U.S. PATENT DOCUMENTS

| 1,861,431 | A | * | 5/1932 | Crawford | 383/6 |
| 2,784,890 | A | * | 3/1957 | Chisholm | 294/152 |
| 2,998,181 | A | * | 8/1961 | Chasolen | 229/117.07 |
| 3,094,258 | A | * | 6/1963 | Punke | 294/32 |
| 3,963,121 | A | * | 6/1976 | Kipp | 206/434 |
| 4,226,192 | A | * | 10/1980 | Myers | 108/53.1 |
| 4,552,271 | A | * | 11/1985 | Kranz | 211/126.16 |
| 4,553,780 | A | * | 11/1985 | Strachan | 294/152 |
| 5,056,843 | A | * | 10/1991 | Johnston | 294/27.1 |
| 5,524,949 | A | | 6/1996 | Mooney | |
| 5,582,296 | A | * | 12/1996 | Beauchamp et al. | 206/503 |
| 5,741,077 | A | * | 4/1998 | Sasaki et al. | 383/10 |
| 5,794,999 | A | * | 8/1998 | Corsaro | 294/16 |

FOREIGN PATENT DOCUMENTS

| EP | 0687633 | 12/1995 |
| EP | 1084645 | 3/2001 |
| WO | 92/09493 | 6/1992 |

* cited by examiner

*Primary Examiner*—Eileen D. Lillis
*Assistant Examiner*—M. Scott Lowe
(74) *Attorney, Agent, or Firm*—Young & Thompson

(57) ABSTRACT

A bag for carrying boxes-shaped objects, preferably pizza boxes (15, 16), includes a rectangular bottom wall portion (1) side wall portions (3, 5) attached to the base wall portion (1) and handles (7) at opposite side wall portions (3). It is significant for the bag that two of the side wall portions (3, 5) constitute main side wall portions (3) that are opposite each other and extend along an entire edge of the bottom wall portion (1), and that at least two of the side wall portions constitute partial side wall portions (5) that extend only along a part of an edge of the bottom wall portion (1).

11 Claims, 4 Drawing Sheets

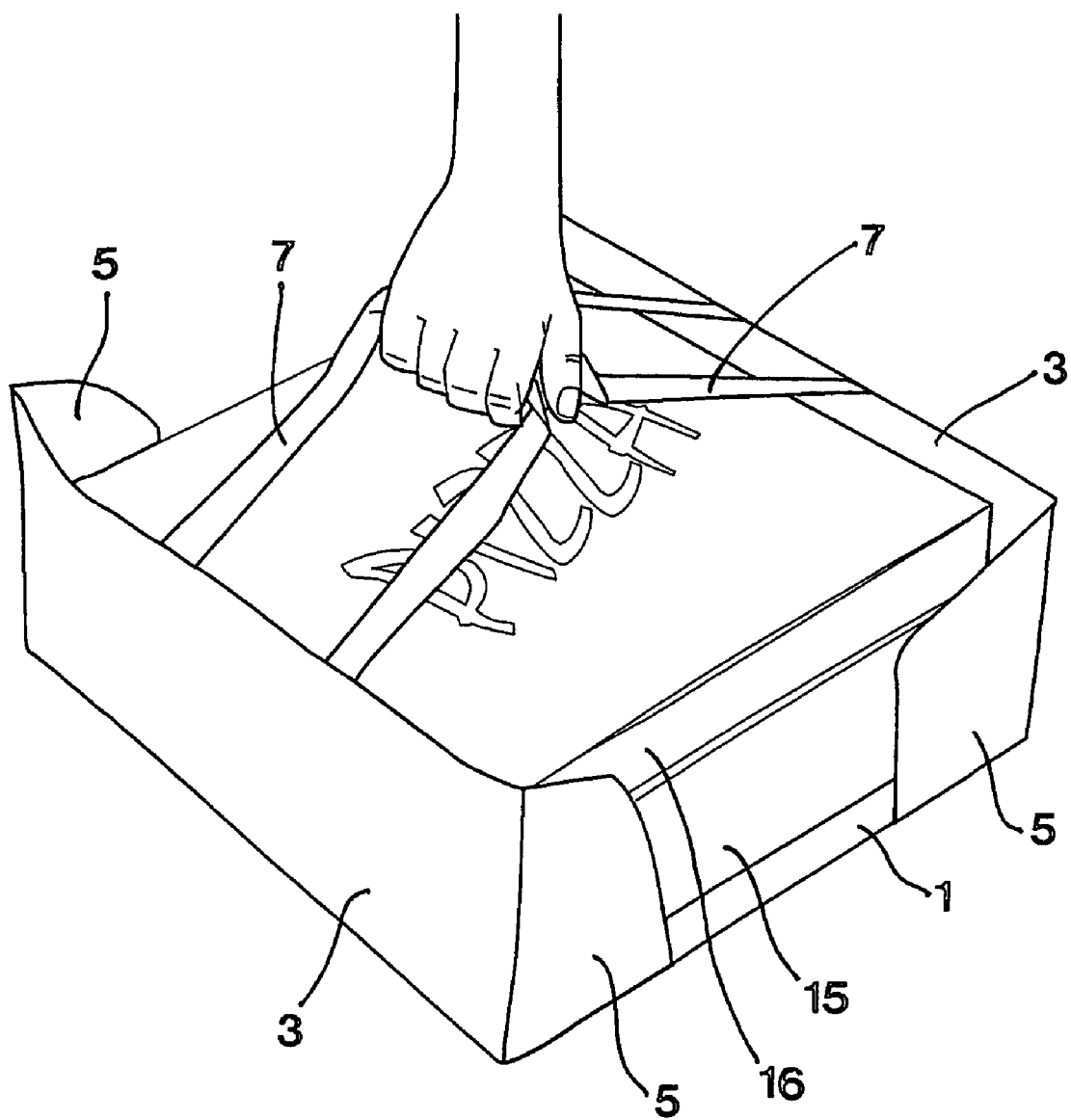

BAG FOR CARRYING BOX-SHAPED OBJECTS

TECHNICAL FIELD OF THE INVENTION

The present invention relates to a bag for carrying boxes-shaped objects, preferably pizza boxes, said bag including a rectangular bottom wall portion, side wall portions attached to said bottom wall portion and handles at opposite side wall portions.

PRIOR ART

From WO 92/09493 a bag for carrying box-shaped objects is previously known. The bag consists of a flexible material, e.g. a thermoplastic. In connection with the placement of a box-shaped object, preferably a pizza box, in the bag the wall portions of the bag are folded sideways and the pizza box is lowered into the bag. Since also the wall portions consist of a flexible material it is difficult to introduce the pizza box in the bag in a simple way. In this connection it should be considered that the operator holds the pizza box with both hands. If the carrying person puts down the bag the side wall portions will fall down and it might be a problem to grab both handles with only one hand.

From U.S. Pat. No. 5,947,884 a bag for carrying box-shaped objects is previously known, said bag consisting of a flexible material and the bag may be brought to assume a flat position in connection with the introduction of the box-shaped object into the bag. Then two opposite side wall portions are displaced laterally, in a direction from each other, and subsequently said side wall portions are pulled upwards to enclose the box-shaped object. In connection with this procedure there must be a sufficient large space available apart from the space that is occupied by the box-shaped object. If the carrying person puts down the bag the side wall portions will fall down and it might be a problem to grab both handles with only one hand.

From DE 298 12 168 U1 a device for carrying one or more box-shaped objects is previously known. In principle, the device constitutes a strap that is provided with openings on one hand for two opposite corners of the package and on the other hand for creating carrying handles. A very significant problem in connection with the device according to DE 298 12 168 U1 is that if the carrying person puts away the device with the box-shaped packages, the ends of the strap will fall down on the ground. Then it could be a problem for the carrying person to get hold of these ends by using only one hand.

OBJECTS AND FEATURES OF THE INVENTION

A primary object of the present invention is to present a bag of the type defined above, said bag being very user friendly, i.e. it should both be simple to place the box-shaped objects in the bag and also to remove said objects from the bag. The bag should also be simple to transfer from stored position to active position. When the carrying person puts away the bag it should be simple for him/her to again grip the handles of the bag.

Still an object of the present invention is that the bag should require a small space in stored position.

A further object of the present invention is to manufacture the bag from a material that could be recycled.

At least the primary object of the present invention is realised by means of a bag that has been given the features defined in the adherent independent claim 1. Preferred embodiments are defined in the independent claims.

BRIEF DESCRIPTION OF THE DRAWINGS

Below an embodiment of the invention will be described, reference being made to the enclosed drawings, where:

FIG. 4 shows how a carrying person grips the bag according to the invention in connection with carrying the bag.

DETAILED DESCRIPTION OF A PREFERRED EMBODIMENT OF THE PRESENT INVENTION

Figure 1:
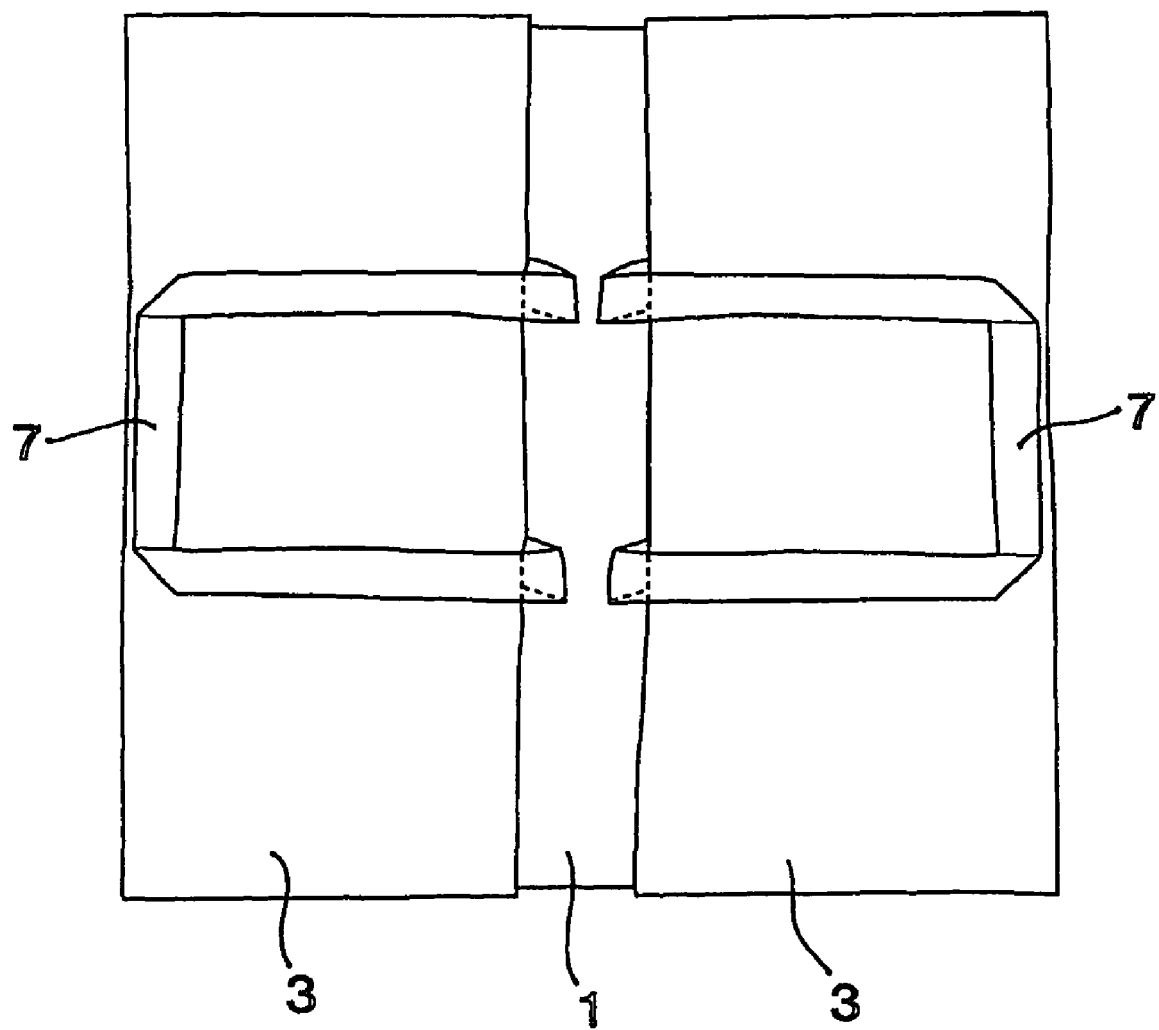
FIG. 1 shows the bag according to the present invention in folded, stored position.
Figure 2:
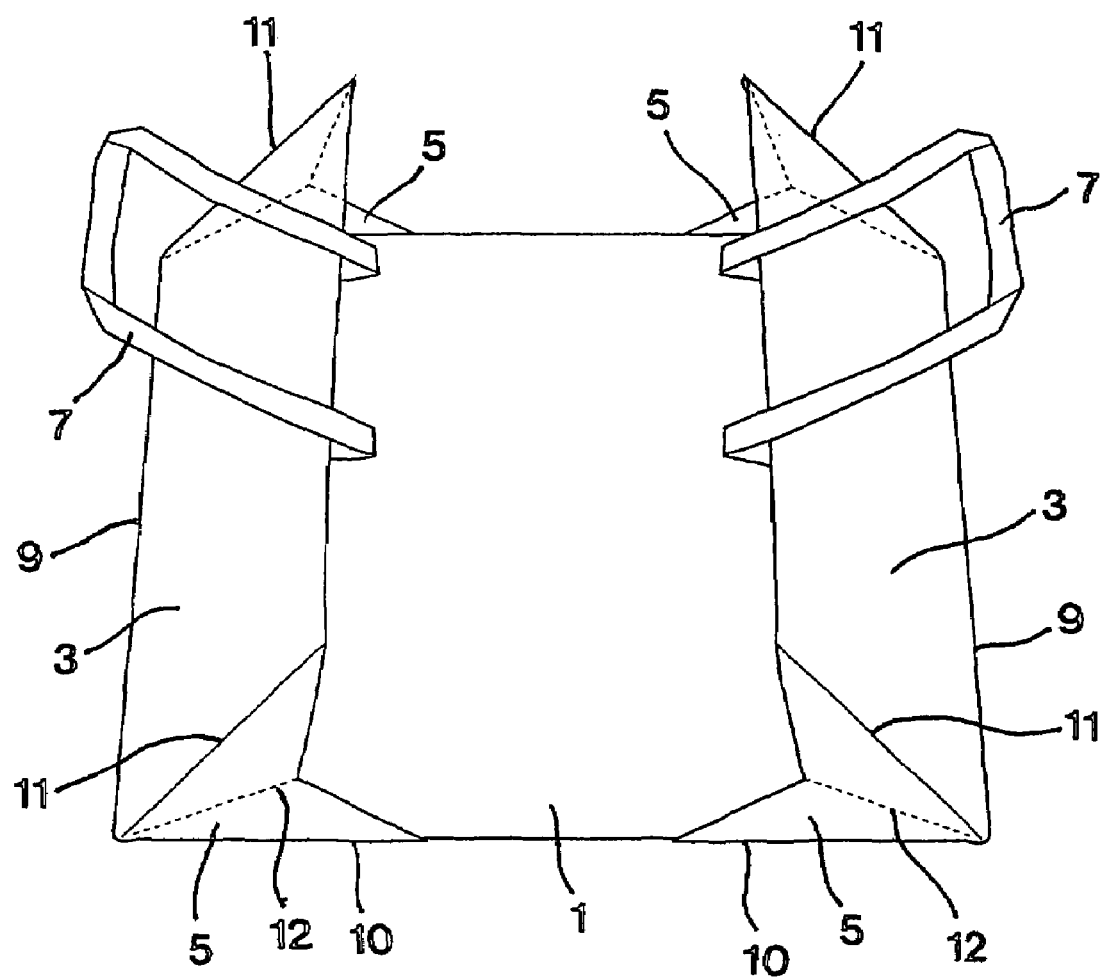
FIG. 2 shows the bag according to FIG. 1 in an intermediate position between folded and erected position.

As is evident from FIGS. 1 and 2 the bag according to the present invention comprises a bottom wall portion 1, two main side wall portions 3, four partial side wall portions 5 and two handles 7. Each one of the main side wall portions 3 are connected to the bottom wall portion 1 via a first fold line 9. Each one of the partial side wall portions 5 are connected on one hand to the bottom wall portion 1 and on the other hand to an adjacent main side wall portion 3. The connection to the bottom wall portion 1 is effected via a second fold line 10 and to the main side wall portion 3 via a third fold line 11. As is evident from FIGS. 2–4 each partial side wall portion 5 has an extension only along a part of the adjacent edge of the bottom wall portion 1. This means that a free space is created between two partial side wall portions 5 that are attached to a common edge of the bottom wall portion 1. In the shown embodiment the partial side wall portions 5 have an extension along said edge that is less than ⅓ of the length of the edge. The function of this free space will be evident from the description below.

The handles 7 are connected to the main side wall portions 3 in the area of the free edge of the main side wall portions 3, said connection preferably being effected by means of an adhesive.

In folded position of the bag according to the present invention the main side wall portions 3 in principle abut the bottom wall portion 1. From FIG. 2 it is evident that each of the partial side wall portions 5 is equipped with an intermediate fourth fold line 12. In folded position of the bag the partial side wall portions 5 will be doubled around said fourth fold line 12. In folded position of the bag, see FIG. 1, the handles 7 are folded to abut against the main side wall portions 3.

The function of the bag according to the present invention will now be described. When the bag according to the present invention is to be used it is normally in folded, stored position according to FIG. 1. The bag then occupies an extremely small space and is preferably stackable. In such a case the main side wall portions 3 abut the bottom wall portion 1 and the handles 7 abut the main side wall portions 3. In order to bring the bag according to the present invention to resume an active position said bag should be transferred from folded position to erected position. In this connection reference being made to FIG. 2 that shows the bag according to the present invention in a position between folded and erected. In connection therewith the main side wall portions 3 have left their abutment against the bottom wall portion 1 and the partial side wall portions 5 are about to assume an erected plane state, the erection being effected around the second fold line 10, the third fold line 11 and the fourth fold line 12.

Figure 3:
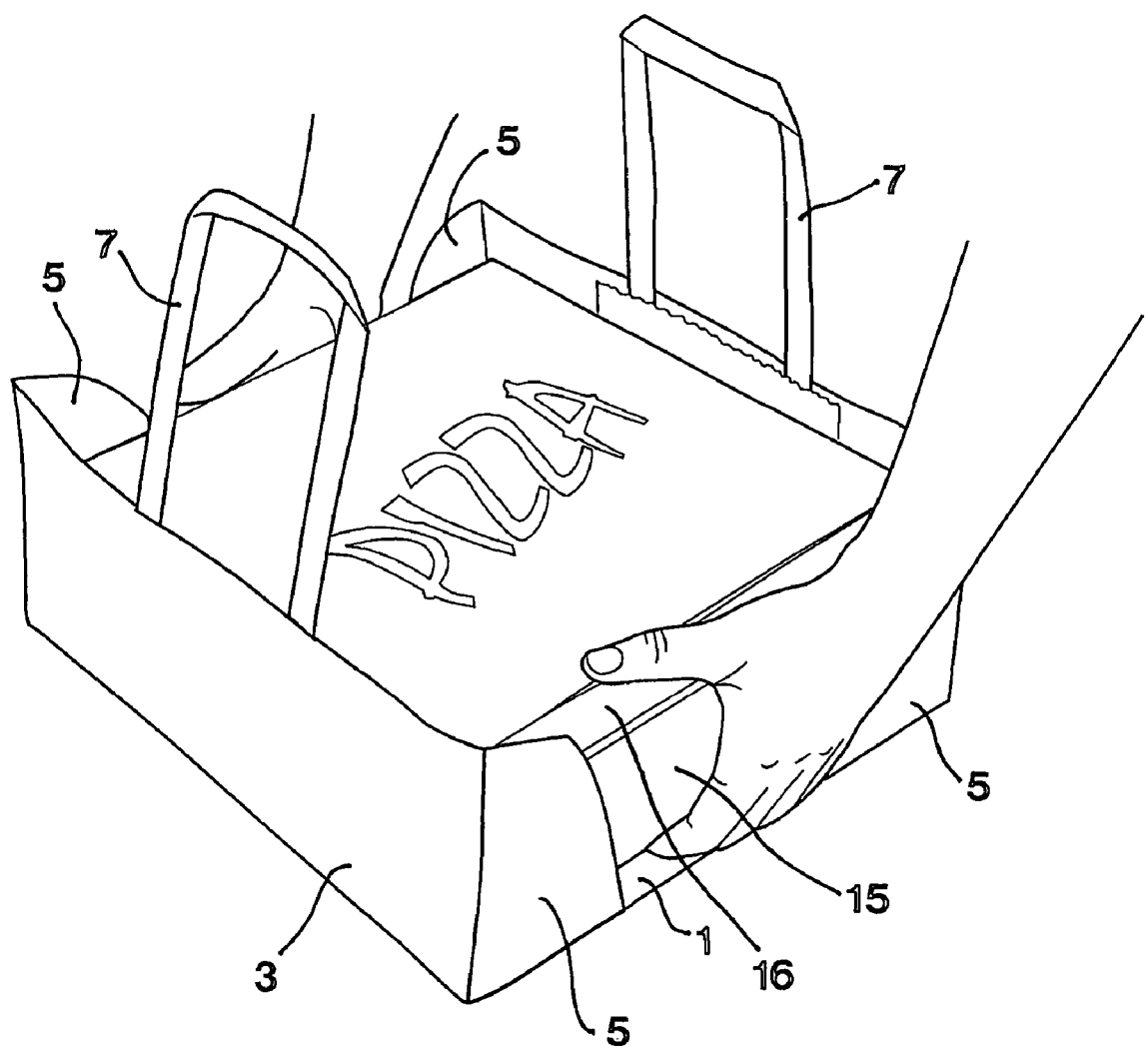
FIG. 3 shows a bag according to the invention in erected position, a number of pizza boxes being positioned in the bag.

In FIG. 3 the bag according the present invention is shown in erected position. Therewith the main side wall portions 3 and the partial side wall portions 5 have an extension essentially perpendicular to the bottom wall portion 1. The handles 7 are also erected and extend upwards. In this connection it should also be pointed out that in the shown embodiment the handles are attached on the inner side of the main side wall portions 3.

In FIG. 3 it is illustrated how two pizza boxes, one higher 15 and one lower 16, are placed in the bag on its bottom wall portion 1. This may be effected in an extremely simple way due to the presence of the above mentioned free spaces between the partial side wall portions 5 along a common edge of the bottom wall portion 1. The free spaces makes it possible for the hands of the operator, said hands gripping around the pizza boxes 15, 16, to reach all the way down to the bottom wall portion 1 in order to place the boxes 15, 16 on the bottom wall portion 1. When the pizza boxes 15, 16 are placed on the bottom wall portion 1 of the bag according to the present invention the bag may be carried away. Thereby the carrying person grips the two handles 7 by one hand, see FIG. 4. In this connection it should be pointed out that it is important that the handles 7 have a sufficient extension, i.e. the distance between the gripping part of the handles 7 and the adjacent opposite edge of the main side wall portion 3 should be more than half of the cross section dimension of the bottom wall portion 1. In case the handles 7 have a too small extension the bag will tighten in the area of the handles 7 and it may also occur that the bag squeezes the box/boxes 15, 16 that is/are located in the bag.

If there is a need to put down the bag, e.g. in connection with the opening of a car door, this may be done without problems. The carrying person quite simply puts the bag down on the ground and the bag in principle assumes the position shown in FIG. 3. When the carrying person wants to repeat the lifting of the bag he/she only grips the handles 7 that are in erected position. In this connection it should be pointed out that when handling the bag according to the present invention, whether it is in folded or erected position, the only required area on the ground in principle corresponds to the area that a pizza box occupies on the ground.

The material of the bag according to the present invention should be a relatively stiff paper, e.g. of the type that is used in so-called paper bags/paper carriers. When the bag has been transferred from folded to erected position the bag should remain in the erected position, see FIG. 3. This functional demand brings about that the paper in the bag should have a certain degree of stiffness.

In the shown embodiment the height of the main side wall portions 3 is less than half the cross section dimension of the bottom wall portion 1 that in principle is in the shape of a square.

The partial side wall portions 5 should, at least in the area where they join the main side wall portions, have a corresponding height.

Feasible Modifications of the Invention

A basic principle of the present invention is to create a free space along two opposite edges of the bottom wall portion 1. However, within the scope of the present invention, the shape and size of the free space may vary as long as it fulfils its function, i.e. to allow access all the way down to the bottom wall portion 1 when a box shaped object is placed in the bag or removed from the bag.

In the embodiment described above the bag has four partial side wall portions 5. However, within the scope of the present invention it is also feasible that the bag has only two partial side wall portions that extend along about half the length of the adherent side edge of the bottom wall portion. In this case the partial side wall portions are preferably arranged diagonally in relation to the bottom wall portion 1. Thereby support is given for both main side wall portions 3 when they are erected. As pointed out above it is however important that that the free space that is created along an edge of the bottom wall portion is sufficiently large to allow the handling that is illustrated in FIG. 3, i.e. that there is room for the hands of the person that takes care of the placement of pizza boxes in the bag and also removal of pizza boxes from the bag.

The invention claimed is:

1. A bag for carrying box-shaped objects, the bag comprising:
   an uninterrupted rectangular bottom wall portion being defined by only four longitudinal edges,
   two main side wall portions that each extend along opposite ones of said longitudinal edges,
   at least two partial side wall portions that each extend along only part of opposite ones of the other of said longitudinal edges,
   the main side wall portions and partial side wall portions being foldable,
   and handles attached to said opposite side wall portions;
   wherein the main side wall portions extend along an entire edge of the bottom wall portion, and partial side wall portions extend only along a part of an edge of the bottom wall portion, said partial side wall portions having a height which is substantially equal to that of the main side wall portions.

2. The bag according to claim 1, wherein there are two partial side wall portions on each of the respective side edges, and a free space extends between two partial side wall portions along a common edge of the bottom wall portion.

3. The bag according to claim 2, wherein one of the partial side wall portions has an extension along the common edge that is less than one third of the entire length of the common edge.

4. The bag according to claim 3, wherein said bag is manufactured from paper, and the side wall portions are attached to the bottom wall portion via fold lines.

5. The bag according to claim 2, wherein said bag is manufactured from paper, and the side wall portions are attached to the bottom wall portion via fold lines.

6. The bag according to claim 1, wherein said bag is manufactured from paper, and the side wall portions are attached to the bottom wall portion via fold lines.

7. The bag according to claim 1, wherein the main side wall portions and adjacent partial side wall portions are joined by a fold line.

8. The bag according to claim 1, wherein the bottom wall portion is a square having equal sides.

9. The bag according to claim 8, wherein the main side wall portions have a height that is less than half the dimension of a side of the square bottom wall portion.

10. The bag according to claim 9, wherein the handles have a gripping part, and the distance between the gripping part and the adjacent opposite edge of the main side wall portion is slightly greater than one half of the dimension of a side of the square bottom wall portion.

11. The bag according to claim 8, wherein the handles have a gripping part, and the distance between the gripping part and an adjacent opposite edge of the main side wall portion is slightly greater than one half of the dimension of a side of the square bottom wall portion.

\* \* \* \* \*